United States Patent
Nelson et al.

(10) Patent No.: US 7,518,489 B2
(45) Date of Patent: Apr. 14, 2009

(54) METHOD AND SYSTEM FOR REMOTE IMMOBILIZATION OF VEHICLES

(75) Inventors: Scott David Nelson, Redondo Beach, CA (US); David Michael Kirsch, San Pedro, CA (US)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 11/336,531

(22) Filed: Jan. 19, 2006

(65) Prior Publication Data

US 2007/0168104 A1 Jul. 19, 2007

(51) Int. Cl.
*B60R 25/10* (2006.01)
(52) U.S. Cl. .................. 340/426.11; 340/426.12; 340/426.17; 307/10.3; 307/10.6
(58) Field of Classification Search .............. 340/426.1, 340/426.11, 426.12, 426.17; 307/10.3, 10.4, 307/10.6; 701/93
See application file for complete search history.

(56) References Cited

U.S. PATENT DOCUMENTS

| | | | |
|---|---|---|---|
| 5,408,211 A | 4/1995 | Hall | |
| 5,729,192 A | 3/1998 | Badger | |
| 5,742,227 A | 4/1998 | Escareno et al. | |
| 5,880,679 A | 3/1999 | Lenart et al. | |
| 5,937,823 A * | 8/1999 | Reeder et al. ............ | 123/335 |
| 5,942,971 A | 8/1999 | Fauci et al. | |
| 6,028,507 A | 2/2000 | Banks et al. | |
| 6,072,248 A | 6/2000 | Muise et al. | |
| 6,127,947 A | 10/2000 | Uchida et al. | |
| 6,133,649 A | 10/2000 | Iwamoto et al. | |
| 6,154,132 A | 11/2000 | Iwamoto et al. | |
| 6,188,140 B1 | 2/2001 | Kito et al. | |
| 6,191,703 B1 | 2/2001 | Wallace | |
| 6,218,932 B1 | 4/2001 | Stippler | |
| 6,249,731 B1 | 6/2001 | Miller et al. | |
| 6,271,745 B1 | 8/2001 | Anzai et al. | |
| 6,282,491 B1 | 8/2001 | Bochmann et al. | |
| 6,297,567 B1 | 10/2001 | Yano | |
| 6,317,035 B1 | 11/2001 | Berberich et al. | |
| 6,404,071 B1 | 6/2002 | Kurano | |
| 6,445,084 B1 | 9/2002 | Daiss | |
| 6,469,616 B1 | 10/2002 | Lindner et al. | |
| 6,470,260 B2 | 10/2002 | Martens et al. | |
| 6,522,027 B1 | 2/2003 | Morillon | |
| 6,538,557 B1 | 3/2003 | Giessl | |
| 6,538,559 B1 | 3/2003 | Okada | |
| 6,538,560 B1 | 3/2003 | Stobbe et al. | |
| 6,549,115 B1 | 4/2003 | Daiss et al. | |
| 6,549,116 B1 | 4/2003 | Honda et al. | |

(Continued)

*Primary Examiner*—Daniel Wu
*Assistant Examiner*—Hongmin Fan
(74) *Attorney, Agent, or Firm*—O'Melveny & Myers LLP; Mark E. Duell

(57) ABSTRACT

Methods and systems are provided for preventing vehicle theft and carjackings. There is provided a method comprising generating an immobilization profile based on the received current vehicle data, and sending the immobilization profile to the vehicle over a wireless communication network. There is also provided a method generally comprising determining current vehicle data regarding vehicle dynamics and driving conditions, obtaining an immobilization profile based on the received current vehicle data, and adjusting vehicle throttle and/or braking (e.g., friction-type braking, engine braking, etc.) so that vehicle speed approximates the immobilization profile. In one embodiment, the above described methods further comprise communicating with the vehicle operator prior to implementing vehicle immobilization profiles.

34 Claims, 11 Drawing Sheets

U.S. PATENT DOCUMENTS

| | | |
|---|---|---|
| 6,664,888 B1 | 12/2003 | Bishop |
| 6,686,670 B1 | 2/2004 | Weigl et al. |
| 6,687,587 B2 | 2/2004 | Kacel |
| 6,710,700 B1 | 3/2004 | Tatsukawa et al. |
| 6,777,826 B2 | 8/2004 | Okimitsu et al. |
| 6,788,189 B2 | 9/2004 | Kikkawa et al. |
| 6,853,894 B1 * | 2/2005 | Kolls ............... 701/29 |
| 6,977,580 B2 | 12/2005 | Banerjee et al. |
| 7,333,012 B1 * | 2/2008 | Nguyen ........... 340/539.1 |
| 7,346,439 B2 * | 3/2008 | Bodin ............... 701/36 |
| 2001/0040503 A1 | 11/2001 | Bishop |
| 2002/0175565 A1 | 11/2002 | Suber et al. |
| 2003/0137409 A1 | 7/2003 | Kikkawa et al. |
| 2003/0210129 A1 | 11/2003 | Aslund et al. |
| 2004/0061600 A1 * | 4/2004 | Wehner et al. ........ 340/435 |
| 2004/0085195 A1 | 5/2004 | McKibbon |
| 2004/0239488 A1 | 12/2004 | Douglass, Jr. et al. |
| 2005/0195069 A1 | 9/2005 | Dunand |
| 2005/0242971 A1 | 11/2005 | Dryer |

\* cited by examiner

| Relative Rate of Deceleration | d, Deceleration in km/s² | Example Protocol Value ("range") |
|---|---|---|
| Slowest Rate of Deceleration | $0.1 <= d < 0.5$ | 0 |
| | $0.5 <= d < 1.0$ | 1 |
| | $1.0 <= d < 1.5$ | 2 |
| | $1.5 <= d < 2.0$ | 3 |
| | $2.0 <= d < 2.5$ | 4 |
| | $2.5 <= d < 3.0$ | 5 |
| | $3.0 <= d < 3.5$ | 6 |
| | $3.5 <= d < 4.0$ | 7 |
| Fastest Rate of Deceleration | $4.0 <= d < 5.0$ | 8 |

METHOD AND SYSTEM FOR REMOTE IMMOBILIZATION OF VEHICLES

BACKGROUND OF THE INVENTION

1. Field of the Invention

The present invention relates to a method and system for preventing vehicle theft and carjackings. More specifically, the present invention provides a system for intelligently immobilizing a vehicle from a remote location by factoring in vehicle dynamics and driving conditions. The present invention also provides a system for interacting with the vehicle operator prior to immobilizing the vehicle.

2. Description of Related Art

Currently there exist a number of technologies for immobilizing vehicles to prevent vehicle theft or carjackings. Current known technologies typically involve static immobilization—that is, the vehicle is immobilized prior to any potential theft or removal of the vehicle from the vehicle's current location. Invocation of static immobilization is typically based on the tripping of the vehicle's anti-theft alarm system, tampering with the vehicle's systems, or operating the vehicle without authorization/authentication (e.g., via operator authentication systems). A common approach to static immobilization involves matching a "smart" key or authentication of the user to the vehicle prior to allowing the vehicle to start. In the absence of the requisite key or authentication, the vehicle becomes prevented from starting, or is shut down in the event of tampering. Certain known systems implement active verification of security credentials and subsequent immobilization if such credentials are breached.

However, static immobilization of vehicles can be defeated by enterprising thieves and criminals, and does not guard against carjacking. There remains a need for a remote vehicle immobilization system and method, whereby vehicle telematics is used to command a vehicle to become immobilized upon instruction from a remote center. If an authorized person or agent, such as the vehicle owner or law enforcement, wishes to immobilize the vehicle for appropriate and acceptable reasons, it is desirable to have a system that allows the authorized person or agent to send a request or command from a remote location (i.e., outside of a close proximity of the vehicle), whereby the vehicle shuts down or becomes inoperable until the immobilization has been defeated.

Existing immobilization systems, which typically involve static immobilization or immobilizing the vehicle from within a close proximity of the vehicle, are not up to the task. What is needed is a method and system that facilitates immobilization of vehicles from a remote location (e.g., a remote response center, law enforcement center, etc.). Furthermore, in the case of a vehicle in motion, there is needed a method for controlling the progression of the immobilization such that the vehicle can be moved to a safe location before the vehicle becomes completely immobilized or inoperable. The method would preferably allow progressive and variable control over immobilization, taking into account not just deceleration and speed, but also vehicle dynamics in general, thereby making it practical to immobilize a vehicle in a public location. Accordingly, it would be very desirable to provide a system and method for remote immobilization of vehicles that overcomes the above-described shortcomings of the prior art while retaining their advantages.

SUMMARY OF THE INVENTION

The present invention addresses the shortcomings of the prior art systems and methods. In particular, the present invention is directed to a method and system for immobilizing a vehicle from a remote location by taking into consideration vehicle dynamics and driving conditions, and by communicating with the vehicle operator prior to implementing vehicle immobilization profiles.

In accordance with one aspect of the embodiments described herein, there is provided a method for remotely immobilizing a vehicle, comprising receiving current vehicle data regarding vehicle dynamics and driving conditions, generating an immobilization profile based on the received current vehicle data, and sending the immobilization profile to the vehicle over a wireless communication network.

In one embodiment, the immobilization profile is characterized by a decrease in vehicle speed over a set time interval, wherein the decrease is determined by at least one of an initial vehicle speed and a roadway congestion index. The decrease in vehicle speed is relatively gradual when the initial vehicle speed is relatively high, and relatively sudden reduction in vehicle speed when initial vehicle speed is relatively low. The immobilization profile can also be characterized by relatively gradual reduction in the vehicle speed under relatively busy driving conditions, and relatively sudden reduction in the vehicle speed under relatively light driving conditions. Generating the immobilization profile can comprise generating a Gaussian profile. Alternatively, generating the immobilization profile can comprise generating a linear profile having one or more linear segments.

In accordance with another aspect of the embodiments described herein, there is provided a method for immobilizing a vehicle in response to an immobilization signal from a remote location, comprising determining current vehicle data regarding vehicle dynamics and driving conditions, obtaining an immobilization profile based on the received current vehicle data, adjusting vehicle powertrain parameters (e.g., vehicle throttle) so that vehicle speed approximates the immobilization profile, and/or adjusting vehicle braking (e.g., friction-based braking, engine braking, etc.) so that the vehicle speed approximates the immobilization profile. The method preferably involves generating a warning message, and providing the warning message to a vehicle operator prior to adjusting the vehicle throttle and/or braking level.

In accordance with another aspect of the embodiments described herein, there is provided a system for remotely immobilizing a vehicle, comprising a receiver unit for receiving current vehicle data regarding vehicle dynamics and driving conditions, a processor unit for generating an immobilization profile based on the received current vehicle data, and a transmitter unit for sending the immobilization profile to the vehicle over a wireless communication network.

In accordance with another aspect of the embodiments described herein, there is provided a system for immobilizing a vehicle in response to an immobilization signal from a remote location, comprising an onboard vehicle computer is programmed to receive current vehicle data regarding vehicle dynamics and driving conditions, obtain an immobilization profile based on the received current vehicle data, and determine a vehicle powertrain control/adjustment parameter. The system further comprises a powertrain unit that makes adjustments to powertrain components upon receiving the powertrain control parameter from the onboard computer. In one embodiment, the onboard computer is further programmed to determine a vehicle braking control parameter, and wherein vehicle braking is adjusted upon receiving the braking control parameter. The onboard computer is typically programmed to generate a warning message and provide the warning message to a vehicle operator prior to adjustment of the vehicle throttle.

A more complete understanding of the disclosed immobilization system and method will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention generally relates to systems and methods for preventing vehicle theft or carjackings. In particular, the present invention is directed to a system and method for immobilizing a vehicle from a remote location by taking into consideration vehicle dynamics and surrounding driving conditions. In the detailed description that follows, like element numerals are used to describe like elements illustrated in one or more of the figures.

Figure 1A:
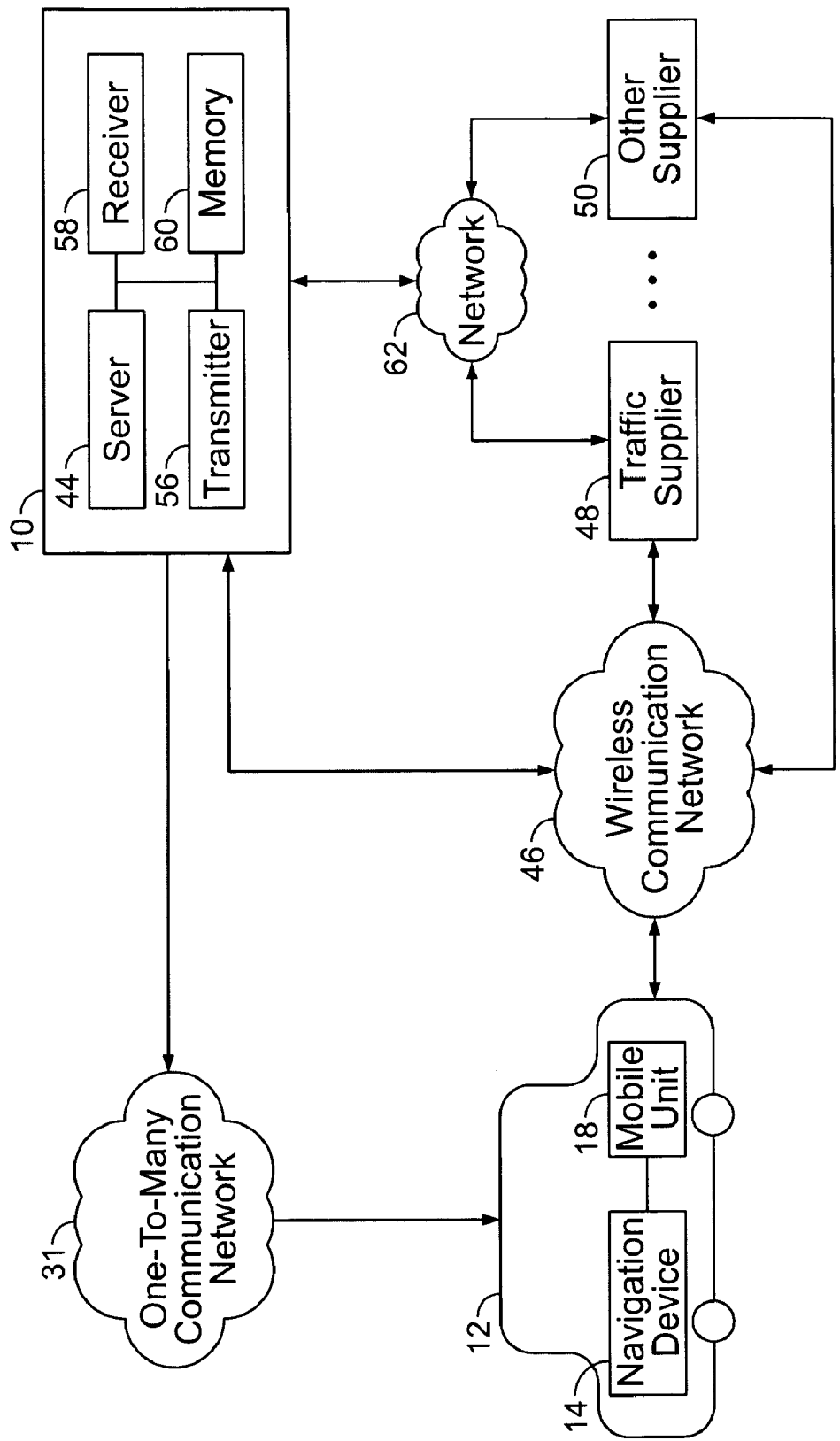
FIG. 1a is a schematic diagram of a first embodiment of a communication system pursuant to aspects of the invention.
Figure 1B:
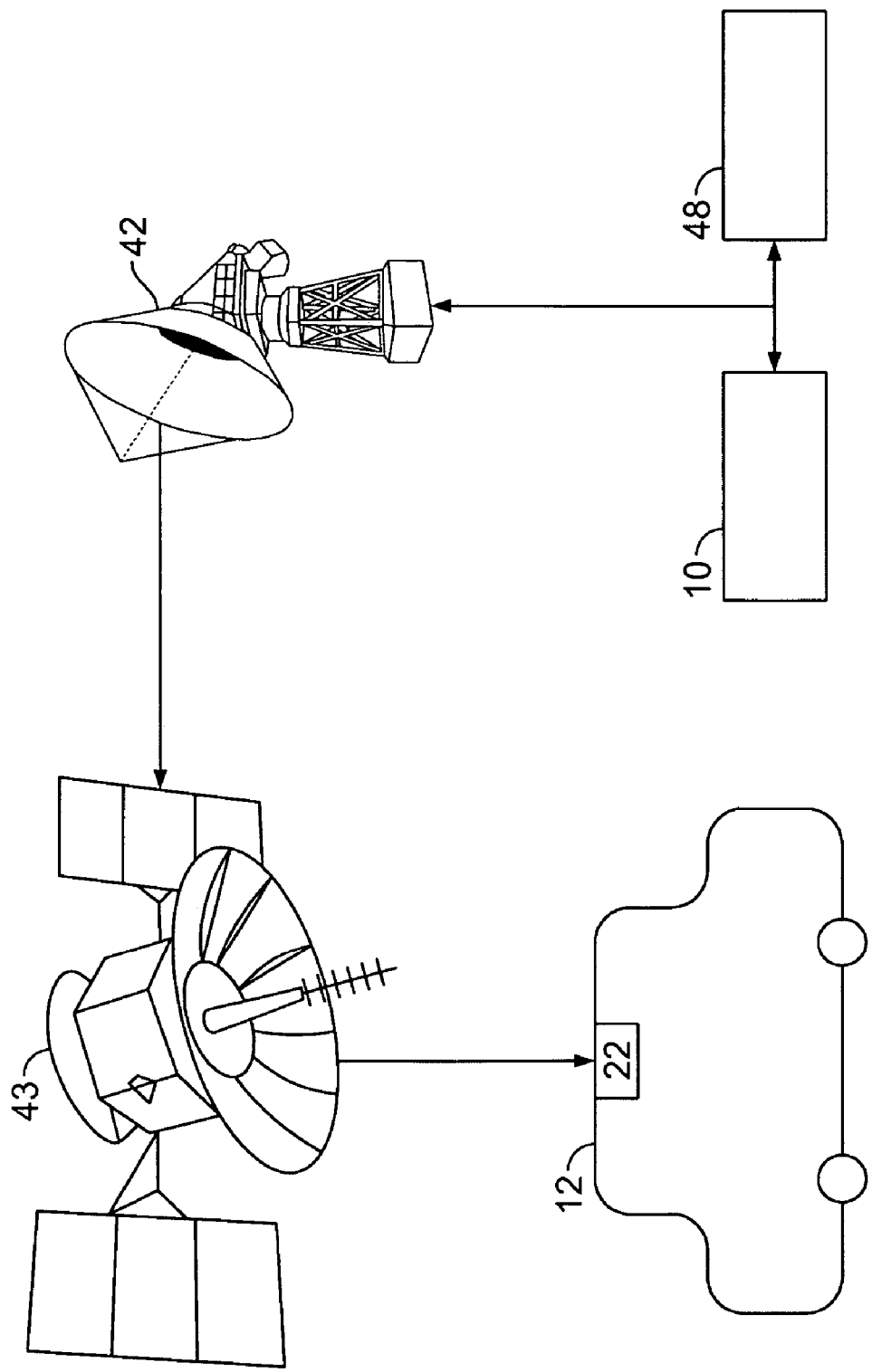
FIG. 1b is a schematic diagram of a broadcast communication network.
Figure 1C:
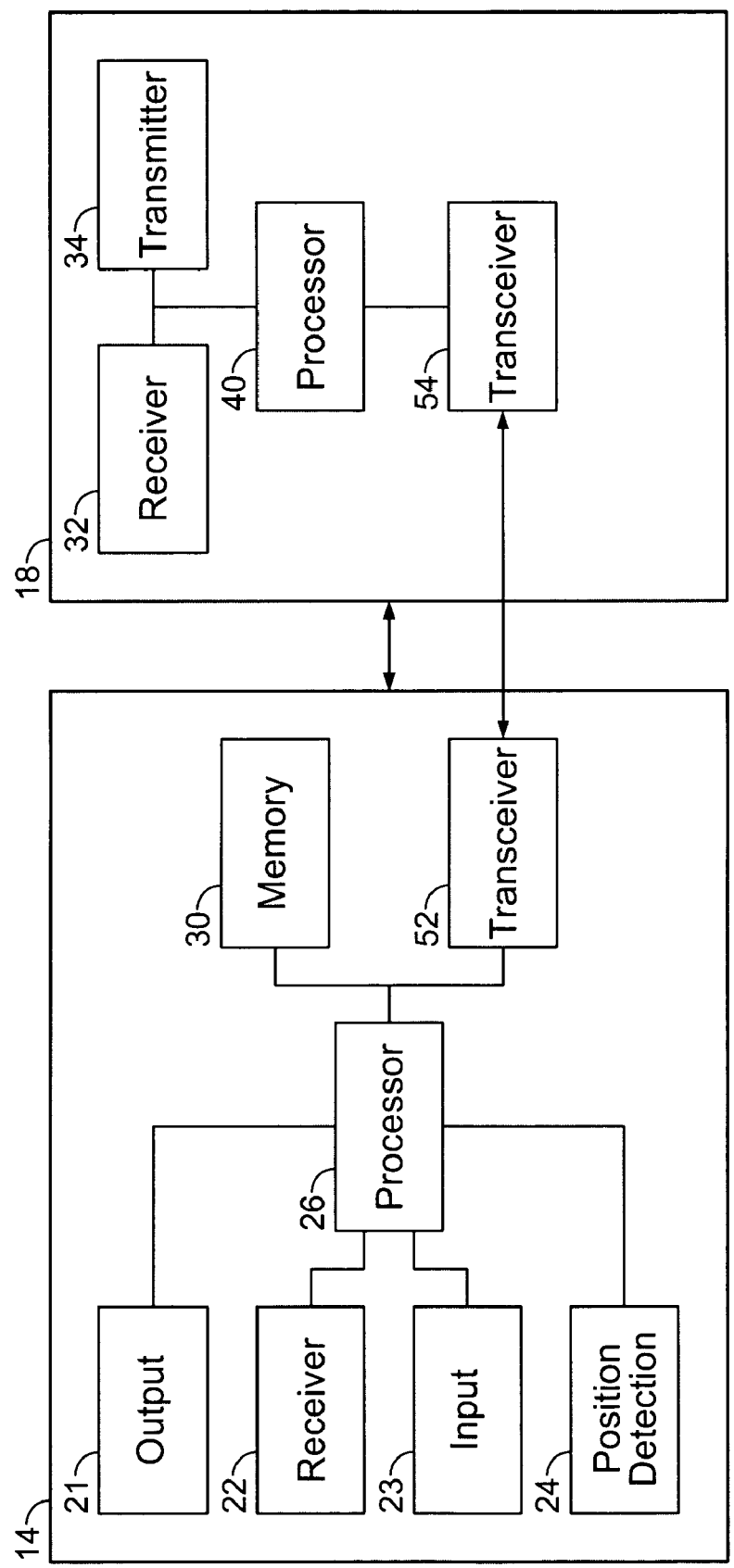
FIG. 1c is a schematic diagram of a navigation device in communication with a mobile unit.

With reference to FIG. 1a, there is provided a first embodiment of a system for the exchange of information between a remote location 10 and a vehicle 12 pursuant to aspects of the invention. The vehicle 12 includes a navigation device 14. Referring now also to FIG. 1c, the navigation device 14 may include an output unit 21, a receiver unit 22, an input unit 23, a position detection unit 24, a navigation memory unit 30, a navigation processor unit 26, and an RF transceiver unit 52 that are all in electrical communication with one another. The navigation memory unit 30 includes at least a portion of a user profile and in some embodiments may include the entire user profile. In addition, the navigation memory unit 30 includes a road map database portion and, in some embodiments, includes a disk reading unit for reading road map information not built into the navigation device 14. As is provided in greater detail below, the user profile and/or the road map database stored in the memory 30 may be updated in the vehicle by way of the input unit 23, which can include at least one of a keyboard, a touch sensitive display, and a microphone. The user profile and/or the road map database may also be updated by way of information received through the receiver unit 22 and/or the RF transceiver unit 52.

The receiver unit 22 receives information from the remote location 10 and, in one embodiment, is in communication with the remote location by way of a one-to-many communication system. One-to-many communication systems include systems that can send information from one source to a plurality of receivers, such as a broadcast network 31. Broadcast networks include television, radio, and satellite networks. Referring now to FIG. 1b, in one embodiment, the broadcast network 31 includes an SDARS or satellite radio (e.g. XM radio or Sirius radio) network 40, comprising broadcast towers 42, satellite servers (not shown), and satellites 43. The broadcast towers 42 transmit information to the satellites 43, which bounce the information back down to the receiver unit 22 of the navigation device 14.

Referring now back to FIG. 1a, the information received by the receiver 22 may be processed by the navigation processor unit 26. The processed information may then be displayed by way of the output unit 21, which includes at least one of a display and a speaker. In one embodiment, the receiver unit 22, the navigation processor unit 26 and the output unit 21 are provided access to only subsets of the received broadcast information based on user preferences and/or traffic information demands. The user preferences, as well as user identity information and traffic-related information, can be part of the user profile.

The position detection unit 24 may include a positioning receiver that communicates with a plurality of positioning satellites (e.g., GPS satellites), separate from the XM satellites, to determine the position of the vehicle 12. For example, in one embodiment, a GPS receiver searches for and collects GPS information (or signals) broadcast from four or more GPS satellites that are in view of the GPS receiver. Next, using the time interval between the broadcast time and reception time of each broadcast signal, the GPS receiver calculates the distance between the GPS receiver and each of the four or more GPS satellites. These distance measurements, along with the position and time information received in the broadcast signals, allow the GPS receiver to calculate the geographic position of the vehicle 12. It will be noted that the positioning technology suitable for the present invention is not limited to GPS technology; rather, the embodiments described herein that utilize GPS technology are merely exemplary.

Figure 2:
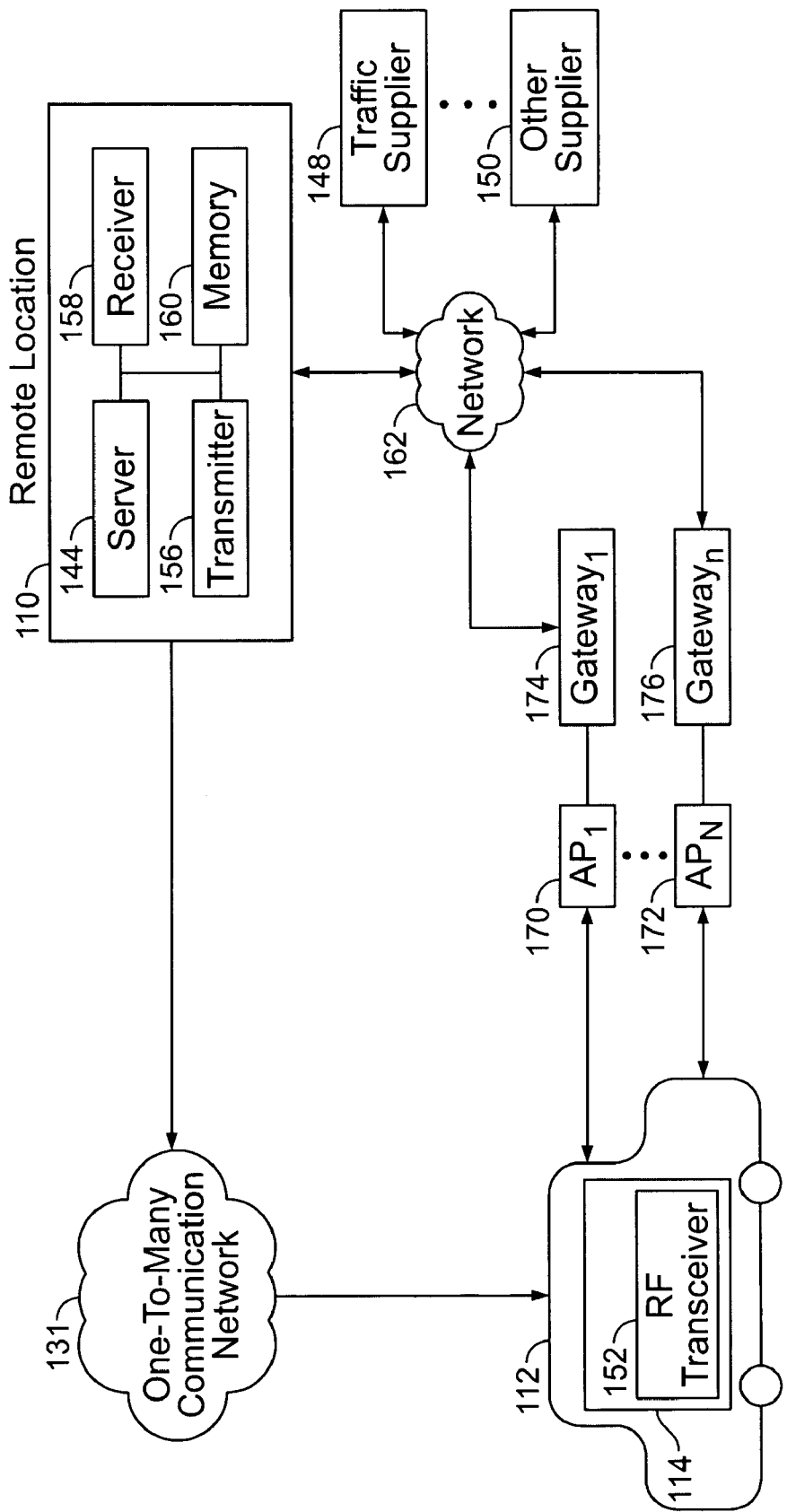
FIG. 2 is a schematic diagram of an alternate embodiment of a communication system.

In the embodiment shown in FIG. 1a, the mobile unit 18 is used to receive and transmit information from and to the remote location 10; and, in an alternate embodiment shown in FIG. 2, an RF transceiver 152 is used to receive and transmit information from and to the remote location 110. The mobile unit 18 may be a wireless phone or any other device that communicates with other devices by way of the wireless communication network 46. As shown in FIG. 1c, in one embodiment, the mobile unit 18 includes a wireless receiver 32, a wireless transmitter 34, a mobile unit processor 40, and an RF transceiver unit 54 that are in communication with one another. The mobile unit 18 is in two-way communication with the remote location 10 by way of the receiver 32, the transmitter 34, and the wireless communication network 46, which may comprise numerous base stations. In one embodiment, information is transmitted from or to the vehicle or remote location over a data channel of the wireless communication network 46 (e.g., a high bandwidth GPRS/1XRTT channel, a low bandwidth DTMF channel, etc.). The receiver 32 receives information from the remote location 10, and the transmitter 34 transmits information to the remote location 10. In other embodiments, the transmitter 34 also transmits information to suppliers of traffic or other information 48, 50.

In one embodiment, the information received from and transmitted to the remote location 10 by way of the mobile unit 18 is accessed by the user through the navigation device 14, which is in communication with the mobile unit 18. The mobile unit 18 may be embedded in the vehicle 12 and be in communication with the navigation device 14 by, for example, a cable (not shown).

In another embodiment, the navigation device 14 and mobile unit 18 are in communication with one another by way of RF transceiver units 54 and 52. Both the navigation device 14 and the mobile unit 18 include RF transceiver units 52, 54, which, in one embodiment, comply with the Bluetooth® wireless data communication format or the like. The RF transceiver units 52, 54 allow the navigation device 14 and the mobile unit 18 to communicate with one another. In other embodiments not shown, the receiver 32 and transmitter 14 of the mobile unit 18 and the receiver unit 20 of the navigation device 14 allow the navigation device 14 and mobile unit 18 to communicate with one another. In yet other embodiments, there may be an RF transceiver that is separate from the navigation device 14 and the mobile unit 18 and that allows the navigation device 14 and mobile unit 18 to communicate with one another.

In the alternate embodiment shown in FIG. 2, the navigation device 114 transmits and receives information to and from the remote location 110 by way of the RF transceiver 152, access points 170, 172, and gateways 174, 176 that are in communication with the network 162. In one embodiment, the RF transceiver 152 and the access points 170, 172 are compliant with the IEEE 802.11 specification, and such transceivers and access points include Wi-Fi®—certified equipment or DSRC/WAVE (802.11p). The access points 170, 172 are typically in communication with the gateways 174, 176 by way of a cable, and the gateways are in communication with the remote location 110 by way of the network 162. The access points 170, 172 are in communication with the RF transceiver 152 and have a limited range over which they can communicate with the RF transceiver 152. Thus, it is preferable that there be numerous access points 170, 172 positioned so that the distance between the access points and the areas through which a vehicle 12 might pass is less than or equal to the limited range of the access points or an altered mesh (e.g. 802.11g) or vehicle-to-vehicle (V2V) or vehicle-to-infrastructure (V2I) can be used. With access to such a suitable network, the RF transceiver 152 effectively exchanges information with the access points 170, 172 and, thus, the remote location 110.

Note that in the alternate embodiment of FIG. 2, the navigation device 114 also includes input and output units, a receiver unit, a memory unit, and a processor unit, none of which are shown. The components of the alternate navigation device embodiment 114 have the same functionality as do the corresponding components of the navigation device 14 of the first embodiment.

The remote location 10, 110 includes a remote server 44, 144, a remote transmitter 56, 156 and receiver 58, 158, and a remote memory 60, 160 that are in communication with one another. As provided above, in the first embodiment, the remote transmitter and receiver 56, 58 communicate with the navigation device 14 and mobile unit 100 by way of the broadcast 31 and wireless 46 communication networks, respectively. In the alternate embodiment, the remote transmitter and receiver 156, 158 communicate with the navigation device 114, including the RF transceiver 152, by way of the broadcast communication network 131 and a network 162. The remote location 10, 110 is also in communication with suppliers of traffic and/or other information 48, 50, 148, 150 such as government traffic information suppliers, private traffic information suppliers, and users of other vehicles, by way of the network 62, 162.

In both the first and alternate embodiments shown in FIGS. 1a-1c and 2, the network 62, 162 is typically a wide area network (WAN) such as the Internet. In other embodiments, some of the information suppliers 48, 50, 148, 150, such as the government and private traffic information suppliers, may be in communication with the remote location 10, 110 by way of a local area network (LAN), while other information providers 48, 50, 148, 150 such as the vehicle users, are in communication with the remote location by way of the Internet. In yet other embodiments, the RF transceiver 152 is in communication with the remote location 110 and/or the information providers 148, 150 by way of a network 162 that is a LAN. In these other embodiments, the LAN 162 is compliant with the IEEE 802.3 specification or is an Ethernet network.

As provided in greater detail below, the information suppliers 48, 50, 148, 150 may transmit updated user profiles and traffic-related information to the remote location 10, 110. A plurality of user profiles are in a user profile database, which, along with traffic-related information, is stored in the remote memory 60, 160. The updated user profiles and new traffic-related information are transmitted from the remote location 10, 110 to the navigation device 14, 114 by way of the broadcast network 31, 131. In other embodiments, the new traffic-related information and updated user profiles may be transmitted to the vehicles 12, 112 by way of the wireless network 46 or the network 162. At the vehicle, the user profile stored in the memory 30 of the navigation device 14 is updated, and the vehicle-related information is made accessible to the user by way of the output unit 26 of the navigation device 14. In other embodiments, the information providers may communicate directly with the mobile unit 18 or RF transceiver 152 by way of the wireless communication network 46 or the network 162.

As explained above, in accordance with one aspect of the embodiments described herein, there is provided a system and method for immobilizing a vehicle from a remote location. In one embodiment, there is provided a method involving the use of immobilization profiles, whereby a profile for deceleration of the vehicle can be prescribed from a remote location, such as remote call center or the like. Rather than simply prescribing a maximum speed which the vehicle cannot exceed, the present method involves implementing a number of stored profiles, each correlated to a set of target ranges of deceleration that takes into consideration the vehicle's current speed.

The remote center can more fully prescribe the parameters of the immobilization profiles, as described in further detail below. Depending on the application, the remote center can send more or fewer details regarding the immobilization profile, thereby shifting more processing away from the vehicle or more processing onto the vehicle, as the situation or scenario dictates. It will be noted that a live operator is not an absolute requirement at the remote center in order to send information regarding immobilization profiles.

The present invention goes beyond setting and controlling vehicle speed via a "speed control module" to achieve immobilization. Reduction in vehicle speed is only one desirable byproduct of the present invention. Vehicle speed reduction can be achieved through various means and access to functions of the vehicle (e.g., braking, throttle control, transmission control, etc.), as explained in further detail below.

For certain vehicles (e.g., hybrids or electrics), reduction in vehicle speed is coupled with activation of regenerative power capture devices. The curves, diagrams, and graphs provided herein are intended to show what happens to vehicle speeds as a result of actions invoked during the remote immobilization process and should not be inferred as direct control over vehicle speed.

Figure 3:
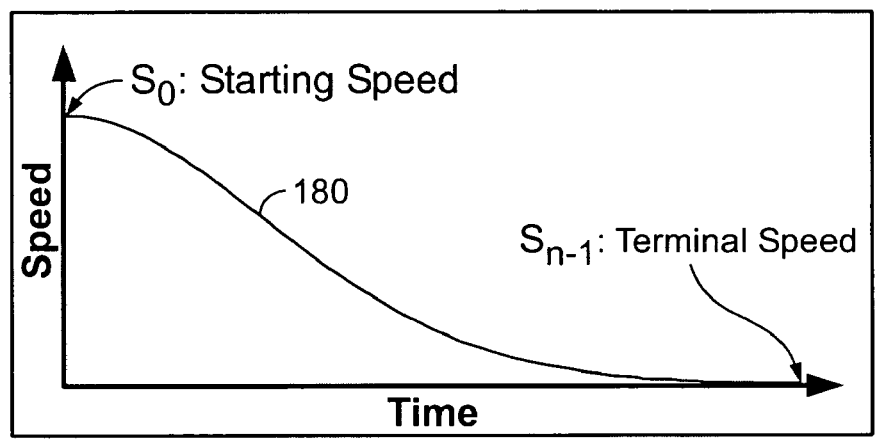
FIG. 3 illustrates an embodiment of a Gaussian immobilizer profile.

As mentioned previously, the remote vehicle immobilization method described herein can implement various immobilization profiles. In one embodiment, shown in FIG. 3, a Gaussian immobilizer profile 180 is used to immobilize the vehicle from a remote location. The vehicle has an initial or starting speed of $S_0$ and a terminal speed of $S_{n-1}$. The relationship between vehicle speed and time resembles the downward sloping portion of a Gaussian distribution curve. For Gaussian type profiles, the terminal vehicle speed will be zero km/h, unless otherwise specified by the remote center. The remote center may specify that the vehicle shut down before reaching zero km/h. Alternatively, since the Gaussian curve 180 approaches 0 as t approaches infinity, as a practical matter, the vehicle can implement a complete stop at some low speed (e.g., less than or equal to about 1 km/h), and also shut down if so instructed by the remote response center.

Figure 4:
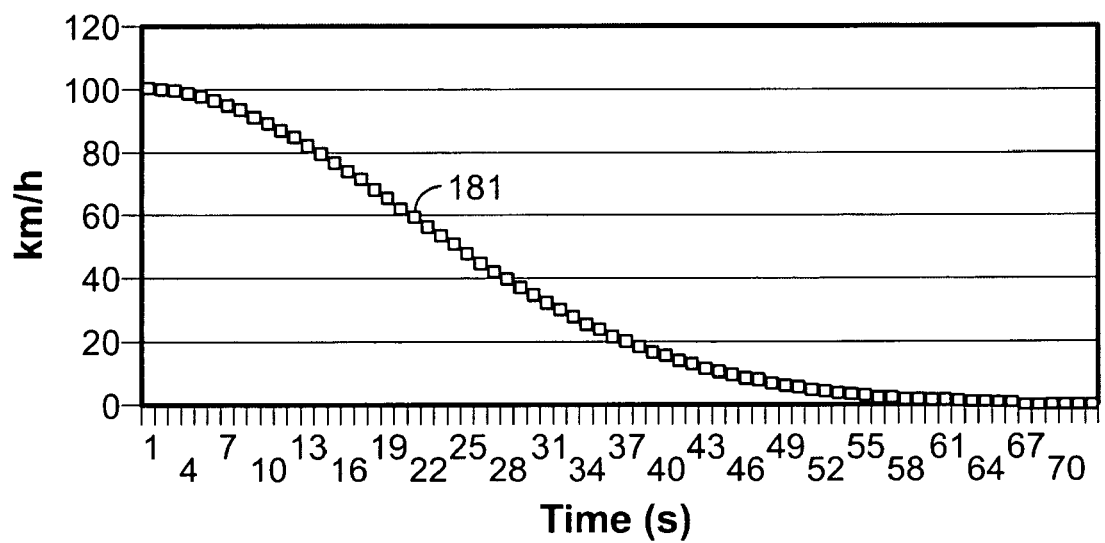
FIGS. 4-7 provide alternative embodiments of Gaussian immobilizer profiles.

With reference to FIG. 4, there is provided a method of using a general curve 181 of a Gaussian distribution to model one such desired immobilization profile:

$$y(x)=k_0 * e^{(-(x-k1)^2/k2)}$$

Simplified and adapted for our use, the above equation becomes $$I_g: y(x)=S_0 * e^{(-(a*x)^s)}, \text{ where:}$$

$I_g$ is the Gaussian model;
$S_0$ is the speed at $t_0$ (i.e. the speed at which the immobilization process is invoked);
a is the fundamental adjustment; and
s is a secondary adjustment.

Figure 5:
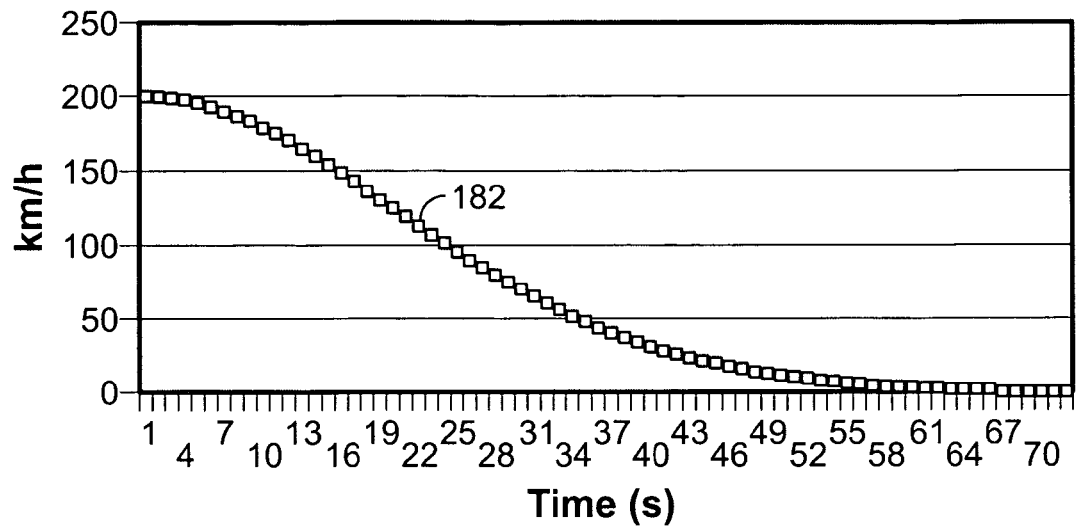
Figure 6:
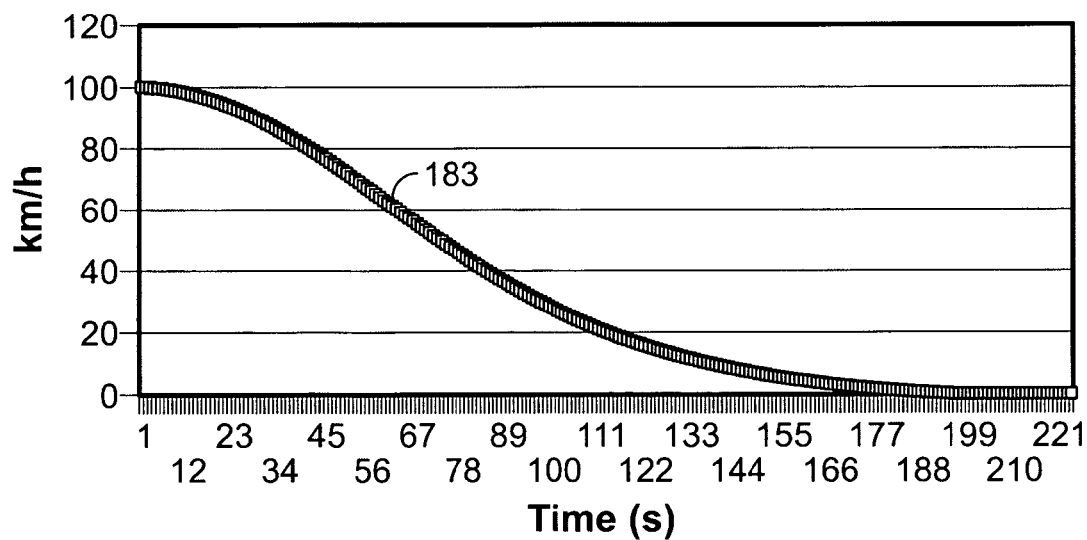
Figure 7:
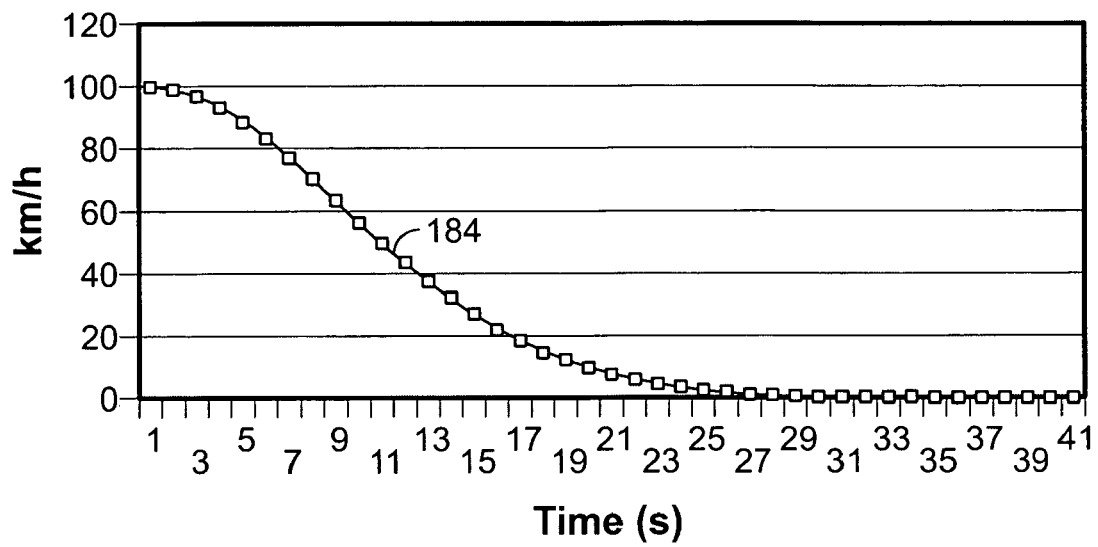

In the embodiment, shown in FIG. 4, the starting speed is about 100 km/h, the average rate of deceleration is about 1.4 km/s$^2$, the immobilization time is within about 70 seconds, and the range is about 2 km. FIG. 5 provides another example of a Gaussian profile 182, wherein the starting speed is about 200 km/h (same curve factors as the embodiment of FIG. 4), the average rate of deceleration is about 2.9 km/s$^2$, the immobilization time is within about 70 seconds, and the range is about 5 km. FIG. 6 provides yet another example of a Gaussian profile 183, wherein the starting speed is about 100 km/h, the average rate of deceleration is about 0.5 km/s$^2$, the immobilization time is within about 200 seconds, and the range is about 1 km. FIG. 7 provides a more extreme Gaussian profile 184, wherein the starting speed is about 100 km/h, the average rate of deceleration is about 3.3 km/s$^2$, the immobilization time is within about 30 seconds, and the range is about 6 km. Immobilization profiles having byproduct average decelerations of greater than about 3 km/s$^2$ will typically be utilized for drastic scenarios, or at very low speeds (e.g., less than or equal to about 30 km/h).

In one embodiment, the remote center sends a command to the vehicle to use a Gaussian type profile to immobilize the vehicle. The remote center optionally transmits to the vehicle: a byproduct deceleration range target; a curve primary adjustment factor (a); curve secondary adjustment factor (s); and/or instructions to shut off the vehicle below a predetermined speed. By allowing flexibility in the parameters described above, the remote center has the option of commanding very good control over the immobilization process, or facilitating more autonomous control by the vehicle by sending a more minimal set of instructions to the vehicle.

Figure 8:
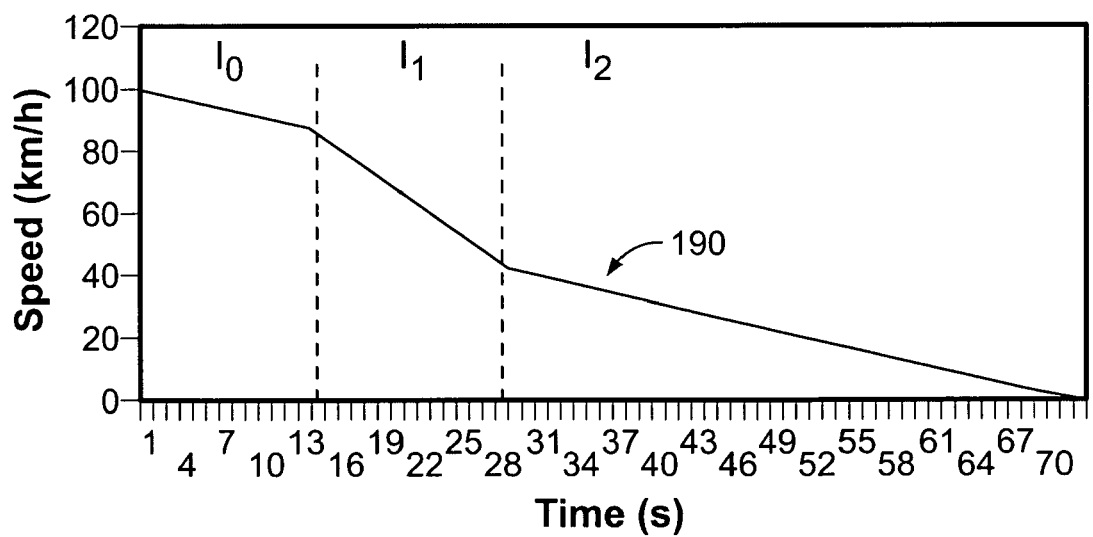
FIG. 8 illustrates an embodiment of a linear immobilizer profile.

In another embodiment, shown in FIG. 8, a linear immobilization profile 190 is implemented to immobilize the vehicle from a remote location, wherein the linear profile has an initial or starting speed of $S_0$ and a terminal speed of $S_{n-1}$, which is typically about zero km/h. The linear immobilization profile comprises a plurality of intervals ($I_0, I_1, \ldots I_{n-1}$), wherein each interval comprises a linear downward slope in the vehicle speed. Since segments of the linear profile can be tailored to the need of any given application or scenario, the terminal vehicle velocity can set to zero km/h and/or the vehicle can be shut down with more flexibility than with the Gaussian immobilizer profile.

Figures 9, 10:
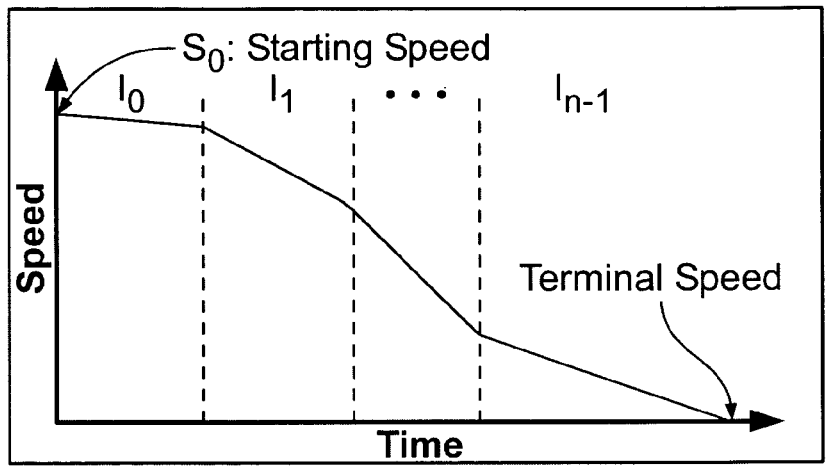
FIG. 9 provides an exemplary set of target deceleration ranges.
FIG. 10 illustrates a linear immobilizer profile comprising three segments.

Vehicle immobilization protocols (e.g., Gaussian immobilization profiles, linear immobilization profiles, etc.) can optionally implement a mapping for target deceleration ranges, such as the set of exemplary ranges provided in FIG. 9. The ranges provided in FIG. 9 are merely exemplary and are provided to demonstrate the concept of mapping deceleration ranges for use in the immobilization protocols. It will be understood that the ranges can be fine-tuned based upon real-life experiences with the rate of deceleration appropriate to particular applications.

FIG. 10 provides a method of using one or more linear segments to model an immobilization profile. Specifically, FIG. 10 illustrates the byproduct deceleration for an exemplary linear immobilization profile having three segments or intervals (i.e., $I_0, I_1,$ and $I_2$). Each segment is linear and can be characterized according the equation y=mx+b, where y is the speed, m is the slope, x is the time, and b is the y-intercept. Each segment can be of the form $I_n$: $y_n=m_n x_n + b_n$.

With continued reference to the embodiment of FIG. 10, the linear profile is characterized by the segments:

$I_0$: $y_0=100-X_0$ $I_1$: $y_1=124-3x_1$ $I_2$: $Y_2=70-x_2$

Figure 11:
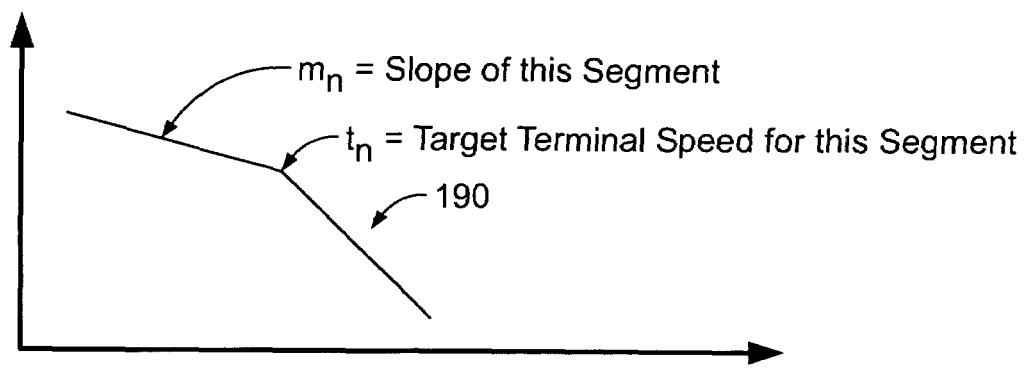
FIG. 11 illustrates the transition between two segments of a linear immobilizer profile.

A vehicle will follow the prescription for byproduct speed and deceleration given by the linear profile through various means of achieving deceleration, as explained in further detail below. If the target byproduct terminal speed of a first segment is below the vehicle's current speed, the vehicle begins to follow the profile at that segment and then follows the proceeding segments according to the immobilization profile 190, as illustrated in FIG. 11.

In one embodiment, the remote center sends a command to the vehicle to use a linear type profile to immobilize the vehicle. The remote center optionally transmits to the vehicle the number of segments in the profile, and/or the slope ($m_n$) and target terminal speed ($t_n$) for each segment. If one or more $m_n$ or $t_n$ values are missing, the vehicle use default linear profile values. The remote center can optionally transmit to the vehicle average byproduct deceleration range targets, and/or instructions to shut off the vehicle below a predetermined speed.

When the vehicle reaches the final terminal speed (final segment $I_{n-1}$) on the linear profile, the vehicle can be programmed or instructed to shut down (i.e., turn the vehicle ignition off). The user is preferably notified that the vehicle is shutting down, as explained in further detail below. When the vehicle comes to a full stop, the vehicle can be instructed to apply a stationary brake, such as a parking brake or movement of the transmission into "park" mode.

In one approach, the vehicle operator is provided with the option of restarting the vehicle with control over durations(s) and allowable number of times. Like other aspects, the processing can be shifted more onto the remote center or more onto the vehicle. The information governing the restart feature can be stored by the vehicle or sent from the remote center. In one approach, the method of activating the restart feature comprises receiving data relating to: the highest speed allowed after restart; the amount of time the vehicle can operate in restart mode; the number of times the vehicle is allowed to restart; and the maximum distance the vehicle is allowed to move after restarting. If the option to implement restartability has been exercised, the option to release the stationary brake and/or transmission from "park" is typically implemented in conjunction with restartability.

In one embodiment, the vehicle operator is provided with the option of disabling vehicle cruise control functionality. This feature is typically implemented as a function on the vehicle side, invoked when the remote immobilization process begins, thereby allowing more certainty over the ability to successfully execute remote immobilization. In another embodiment, the vehicle operator is provided with the option of activating the vehicle's hazard indicators or flashers. This feature is typically implemented upon invoking remote immobilization; upon reaching a predetermined speed; and/or based upon the average calculated deceleration, actual or theoretical.

Figure 12:
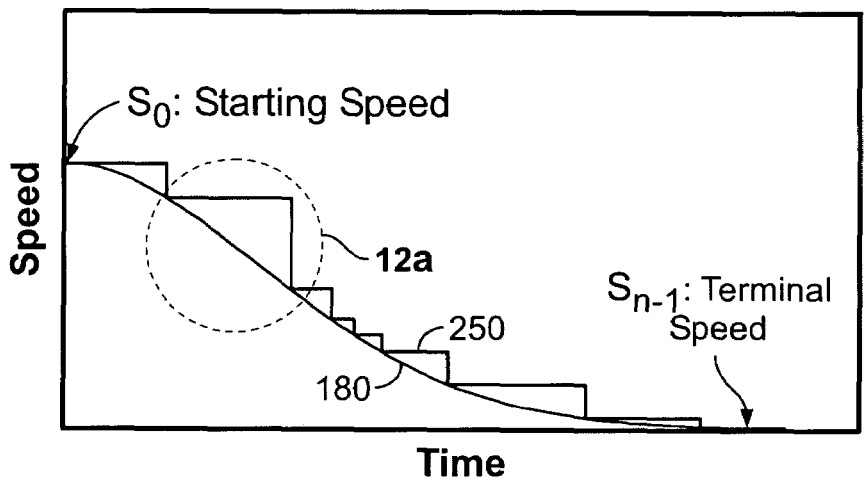
FIG. 12 illustrates an approach to implementing a Gaussian immobilizer profile without exercising control of vehicle braking.
Figure 12A:
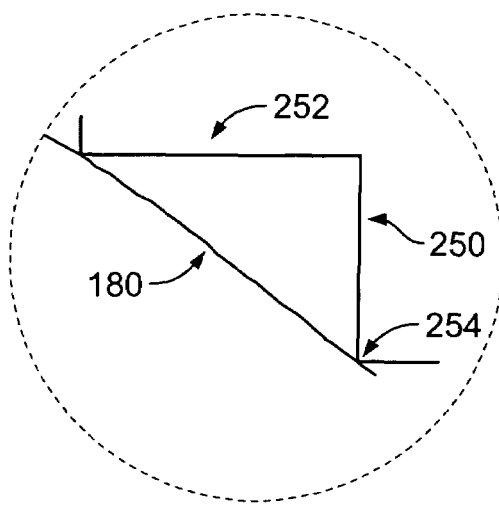
FIG. 12a provides a close-up of a section of an average actual throttle and power output curve superimposed on a theoretical Gaussian immobilizer profile.

Given the different profiles and the various ways to implement deceleration and immobilization, there are various approaches to managing deceleration and immobilization. In one approach, the immobilization process does not exercise control over vehicle braking (electronically or hydraulically or mechanically). With reference to FIG. 12, there is provided an approximation of an average actual throttle and power output curve 250 that is superimposed on a theoretical Gaussian immobilizer profile 180. Curve 250 comprises a plurality of steps that generally follow profile 180. The number of steps it takes for a vehicle to achieve the targeted terminal velocity depends in part on the operator's driving behavior. Small, regular adjustments to the driver's behavior (e.g., adjustments to the throttle or lifting of the throttle at various points) will drive the actual speed of the vehicle along the immobilization profile 180 towards zero. With reference to FIG. 12a, there is provided a close-up view of a section of curve 250 and profile 180, wherein curve 250 comprises horizontal portion 252 and juncture 254. Horizontal portion 252 represents steady-state throttle and output power, within an allowable variance. Juncture 254 represents lift of vehicle throttle, resulting in a new output power limit at this correlated throttle position and output power.

As explained previously, existing immobilization technology is static and does not utilize vehicle telematics technology that makes it possible to communicate with and send instructions to the vehicle from a remote location. The existing art in the area of remote immobilization is limited to using a speed control module to set a maximum vehicle speed, which can be impractical for public use. The present invention treats deceleration and the resulting decreasing speed as byproducts of the remote immobilization process. More specifically, provided herein are methods and systems for adjusting throttle position, correlated to the output power (and possible other inputs and variables involving handling dynamics and vehicle orientation in the driving environment), to implement a descried immobilization profile without having to set a maximum vehicle speed.

The invention herein includes the option to use braking, and relies upon the use of "intelligent" immobilizer profiles to better control the process of immobilization. This processing can optionally include higher levels of information to make decisions, such as how to best control the progression of immobilization. The present invention makes it possible to intelligently modulate the resulting byproducts (e.g., deceleration and reduction of speed) with a higher level of processing, intelligence, control in the context of the vehicle and its environment to enable a service that can operate autonomous of a live operator.

In accordance with one aspect of the embodiments described herein, there is provided a system for immobilizing a vehicle from a remote location. The system generally comprises a receiver unit for receiving current vehicle data regarding vehicle dynamics and driving conditions, a processor unit for generating an immobilization profile based on the received current vehicle data, and a transmitter unit for sending the immobilization profile to the vehicle over a wireless communication network.

In accordance with another aspect of the embodiments described herein, there is provided a system for immobilizing a vehicle in response to an immobilization signal from a remote location, comprising an onboard vehicle computer programmed to: (a) receive current vehicle data regarding vehicle dynamics and driving conditions; (b) obtain an immobilization profile based on the received current vehicle data; and (c) determine at least one vehicle powertrain adjustment/control parameter. In one embodiment, the at least one vehicle powertrain adjustment parameter adjusts the vehicle's throttle to achieve the immobilization profile. The vehicle typically has a powertrain subsystem that generally involves components that control or affect the vehicle's drive system. This can include the engine, the transmission, the throttle, separate driveshafts, differential, etc. In another embodiment, the onboard computer is programmed to determine at least one vehicle braking adjustment/control parameter.

It will be understood, however, that the vehicle immobilization profile goes beyond setting a maximum vehicle speed for a powertrain controller or the like; rather, the present invention typically involves bringing the vehicle to a stop in a time-dependent manner while taking into account driving conditions and/or vehicle dynamics. Driving conditions can include traffic conditions or density, weather conditions, lane position in road link, type or class of road/highway/street, speed limit, etc. Vehicle dynamics can include initial vehicle speed, acceleration/deceleration level, braking inputs, present throttle level, current vehicle speed, yaw, wheel slip, steering wheel angle, vehicle roll, etc.

In one exemplary embodiment, the processor unit is programmed to generate the immobilization profile so that there is relatively gradual reduction in vehicle speed when initial vehicle speed is relatively high, and relatively sudden reduction in vehicle speed when initial vehicle speed is relatively low. Likewise, the processor unit can be programmed to generate the immobilization profile so that there is relatively gradual reduction in the vehicle speed under relatively busy driving conditions, and relatively sudden reduction in the vehicle speed under relatively light driving conditions.

For example, immobilization profile can be defined such that there is less than about a 20 percent decrease in vehicle speed over a time interval of about 5 seconds when initial vehicle speed is higher than a first predetermined speed, and less than about a 20 percent decrease in the vehicle speed over a time interval of about 5 seconds when the vehicle is on a roadway having a roadway congestion index that is greater than a first predetermined roadway index. In one embodiment, the first predetermined speed comprises a range from about 80 km/hour to about 200 km/hour. In one exemplary embodiment, the first predetermined speed is about 150 km/hour. In another embodiment, the first predetermined roadway index comprises a range from about 0.80 to about 2.00. In yet another exemplary embodiment, the first predetermined roadway index is about 1.30.

The immobilization system can utilize controlled vehicle braking, such that more measured and incremental control of immobilization of the vehicle can be exercised. Vehicle braking can include the application of friction-type (i.e., traditional) braking systems and/or regenerative braking (typical in hybrid or electric vehicles). Vehicle braking can also include engine braking or downshifting (optionally using transmission control to reduce gearing), or another suitable drive train method to reduce vehicle speed. When a braking mechanism is exercised, the byproduct deceleration and resulting byproduct speed movement along the immobilizer can be made more or less gradual. The braking mechanisms can be applied at regular or variable intervals, intermittently, or constantly to achieve the desired target given by the immobilization profile. In embodiments that involve control over braking, it is preferable that the brake lights (e.g., adaptive brake lights systems or the like) are also controlled in conjunction with the braking systems (especially friction brakes).

Figure 13:
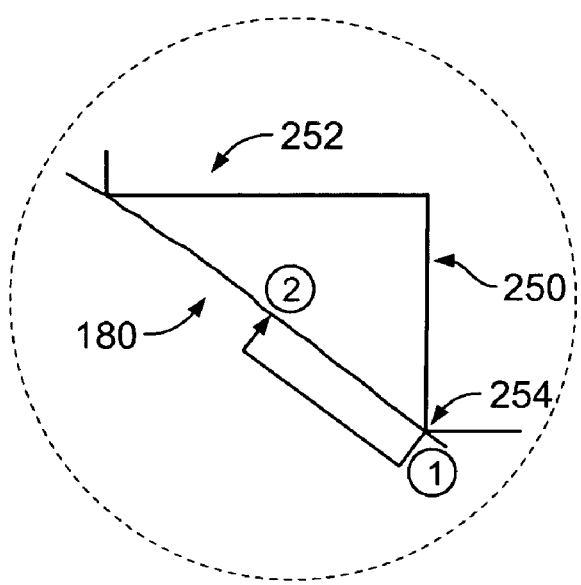
FIG. 13 illustrates an approach to calculating updated throttle limits according to vehicle's current situation.

Situations may arise in which it is desirable to invoke new limits when the operator lifts the throttle. For example, it may be inadvisable to impose a hard limit if the calculated change in speed is determined to be too large (e.g., may impart undesirable characteristics on the handling dynamics of the vehicle), or in a situation where setting such a limit could impart too much confusion of the operator. In one approach, shown in FIG. 13, the option is reserved to calculate a new "artificial" limit (i.e., a limit deemed more acceptable than that correlated to the immediately previous measurement of the throttle position and correlated power output), within a range acceptable given inputs, such as potential byproduct speed, yaw, wheel slip, steering wheel angle, braking inputs, vehicle roll, etc. Such calculations will generally be done by the vehicle and its processor(s) and/or controller(s) which may be central to the immobilizer system, or adjunct to the system supporting it. In the example shown in FIG. 13, a new limit is set at Point 2 (deemed to be more desirable given current vehicle and operator situation) instead of at Point 1.

In accordance with another aspect of the present invention, there is provided a method and system for interacting with a vehicle operator prior to remotely immobilizing the vehicle, and for making context-based decisions prior to acting on a remote immobilization request. There are situations where it may not be desirable to simply immobilize the vehicle on-demand without presenting some opportunity for the operator to relocate the vehicle from its current position, or without communicating with the vehicle occupants. As such, the present invention provides a method and system for safely and effectively invoking remote vehicle immobilization by providing ample notice to the vehicle operator.

In one approach, the method for interacting with the vehicle operator prior to immobilization of the vehicle comprises utilizing an onboard computer and intelligence in the vehicle itself to communicate with the vehicle occupants before the vehicle becomes immobilized, thereby providing an alternative to relying on voice contact with the service provider and/or law enforcement to interact with the vehicle operator. Processors and agents in the vehicle (typically electronic control units) are able to act intelligently on such request for invocation of immobilization. A decision is made by the vehicle's processors and agents as to how to best handle the immobilization given the operating condition of the vehicle. If the vehicle is currently in gear or in motion, a configurable timeout period and warning is offered to the operator, giving the operator sufficient time to adjust operating conditions of the vehicle, such as pulling off the road or parking the vehicle. The method can comprise providing a visual warning message to vehicle occupants via a display unit, such as the display unit of a vehicle's navigation and telematics unit.

Figure 16:
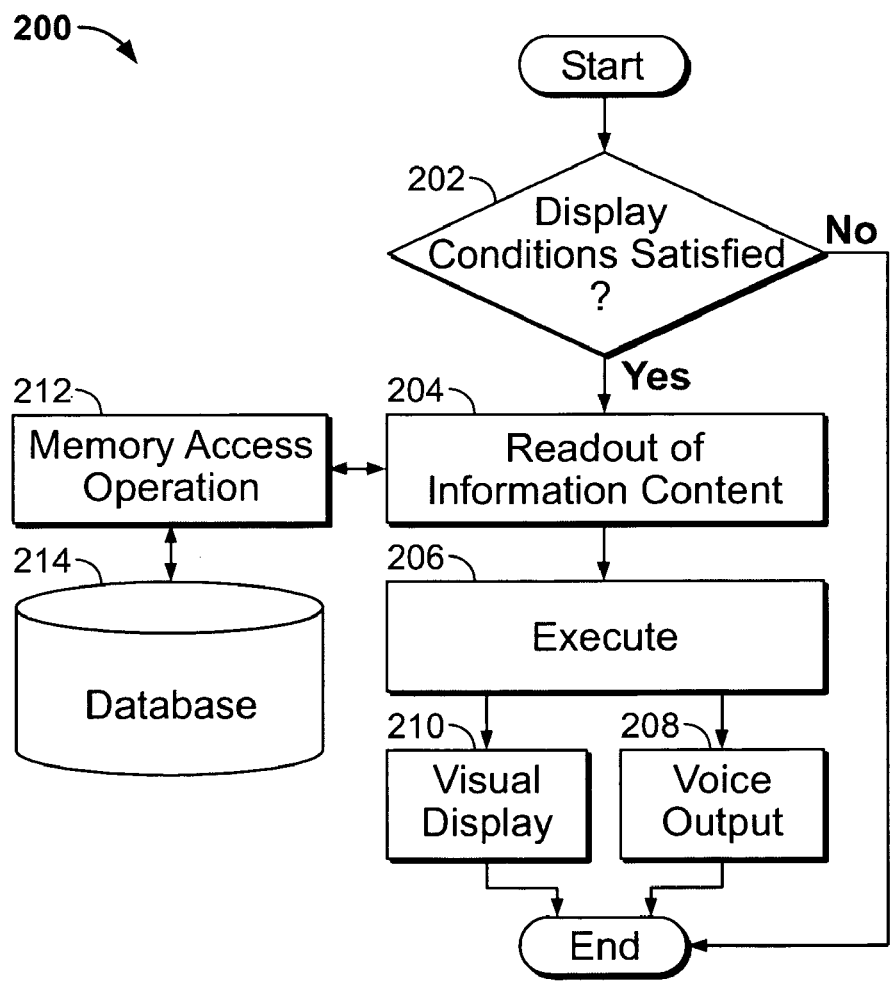
FIG. 16 outlines the steps of a method for presenting received broadcast data to a vehicle operator.

FIG. 16 illustrates a method 200 for presenting received broadcast data to the vehicle operator. First, in step 202, a determination is carried out as to whether the vehicle is in agreement with the conditions stored in advance. In one embodiment, three predetermined display conditions are tested in step 202. It should be appreciated that any number of desired conditions of various types may be tested. A first condition can relate to whether the broadcast data should be presented immediately after being received. A second condition can relate to whether a condition matches a vehicle physical state. The third condition can relate to whether an electronic control unit (ECU) of the vehicle is in diagnosis mode or not.

The vehicle physical state refers to the state of physical characteristics inherent to the vehicle such as the traveled distance, the oil status, and the model year. For example, using individually predetermined thresholds, such as for traveled mileage, periods for replacement of replacement parts, and the like, it can be determined whether the state of the vehicle at the present time exceeds the thresholds. If the conditions specified for an incoming message are not satisfied, the processing may be stopped at 218 without outputting or storing the received message. Likewise, a code or information associated with a message may indicate a particular time for display, or that a message should be displayed when the ECU is in a diagnosis mode. In such case, a message may be discarded if the timing condition is not satisfied, and method 200 may end at 218. In the alternative, the message may be saved at step 212.

If the conditions are satisfied in step 202, the associated message information may be processed at step 206 for visual and audio output at steps 208, 210. In the alternative, or in addition, all or a portion of message information may be obtained from a memory access operation 212 and compiled into a desired message at step 204. For example, a message may be associated with a code or memory address indicating a memory location where information stored in a database 214 may be found. Stored visual or audio message data may be retrieved from database 214, and combined with received message data at step 204.

At step 206, a message compiled at step 206 may be formatted for output to an intended audio or visual output device. For example, a portion of the message may comprise text data for visual output. This visual message portion may be processed for output to a suitable display system or device. Likewise, all or a portion of the message may comprise data marked for audio output. This audio output may be processed for output to an audio output device, such as by processing using a text-to-speech synthesizer or recorded speech to be replayed. As explained in more detail later in the specification, a particular message may comprise a string of text data with defined portions for visual and audio output. Advantageously, such a message may be readily encoded and transmitted over a wireless connection while minimizing bandwidth requirements. In the alternative, other forms of message data may be used, such as graphical data.

Message data for display may be displayed at step 210, such as by using an existing vehicle display system. Many vehicles are equipped with video display screens for navigation and other functions. It is anticipated that all or a portion of such a display may be used to present a text message. Likewise, many vehicles are equipped with a sound system for playing music, that may be used at step 208 for audio output. For example, text data may be synthesized into speech by an on-board computer, and played on the vehicle's sound system, or using a separate loudspeaker. It is desirable to present both audio and visual data to the vehicle user. It should be appreciated that the messages and control codes presented are merely exemplary, and the invention may be used to present any desired message to a vehicle operator, using any desired form of control code. It should be appreciated that multiple different code types may be combined in an interoperable fashion in a single message.

Figure 14:
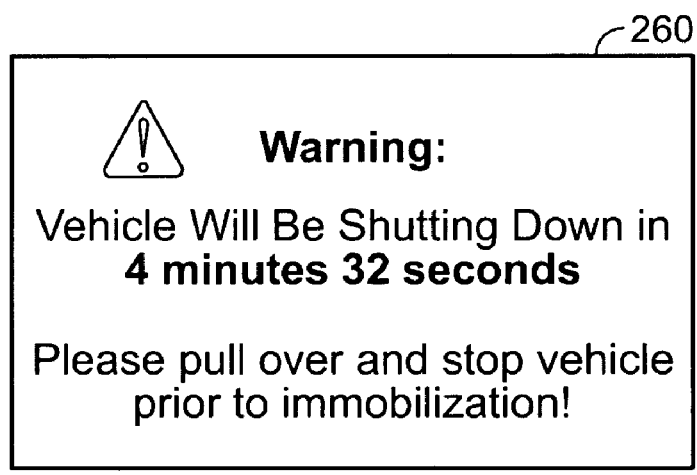
FIG. 14 provides an exemplary visual warning provided to a vehicle operator prior to vehicle immobilization.

With reference once again to FIG. 14, there is provided an exemplary message 260 that can be displayed to the vehicle operator prior to initiation of the immobilization process. The message 260 will typically be displayed in a display unit in or near the vehicle's dashboard. The warning text of the message will typically warn the vehicle operator that the vehicle will be shutting down, and preferably includes disclaimers and notices of consequences to the operator. The message can include a countdown to the point of immobilization. The text displayed in the exemplary message 260 of FIG. 14 is appropriate for applications where the vehicle is moving, but is only one example of the working and contextual content displayed to the vehicle operator. The text content can be contextual and vary per language of implementation and user. For example, for applications where the vehicle is not moving, a simpler message that the vehicle will be shutting down can be displayed to the operator before the immobilization process begins.

Figure 15:
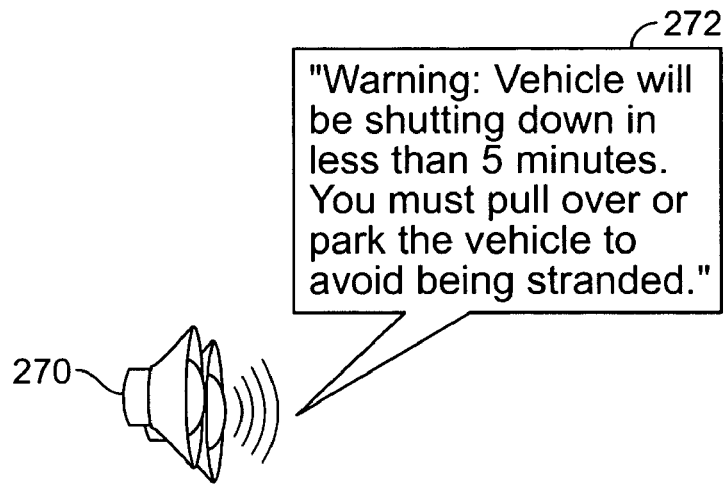
FIG. 15 illustrates the use of a vehicle's audio and speech resources to provide an auditory warning to the vehicle operator prior to vehicle immobilization.

In another embodiment, the method comprises providing a voice feedback or warnings to the vehicle operator prior to vehicle immobilization. As illustrated in the embodiment of FIG. 15, the audible message can be played through the vehicle's audio and speech resources 270 (e.g., speakers in the vehicle) and can comprise a played message 272, such as "Warning: Vehicle will be shutting down in less than 5 minutes. You must pull over or park the vehicle to avoid being stranded." The method for providing visual and/or auditory feedback can optionally include offering the vehicle operator a last resort, final warning or series of such warnings. The final warning can be along the lines of "Final notice. The vehicle will be shutting down in fifteen seconds." However, if the vehicle is not currently in gear, the vehicle can simply be immobilized without warning the operator. Such decisions are highly contextual and dependent upon the implementation. For example, the decision to give such advanced warnings might always be applied once the vehicle is in gear but may not be given at all if the operator has not engaged the transmission, resulting in "silent immobilization" of the vehicle.

Having thus described a preferred embodiment of a method and system for immobilizing a vehicle from a remote location, it should be apparent to those skilled in the art that certain advantages of the within system have been achieved. It should also be appreciated that various modifications, adaptations, and alternative embodiments thereof may be made within the scope and spirit of the present invention. For example, the use of broadcast communication networks has been illustrated, but it should be apparent that many of the inventive concepts described above would be equally applicable to the use of other non-broadcast communication networks.

What is claimed is:

1. A method for remotely immobilizing a vehicle, comprising:
   receiving current vehicle data regarding at least vehicle dynamics and driving conditions, the vehicle dynamics comprising current vehicle speed on a roadway, the driving conditions comprising a roadway congestion index;
   generating an immobilization profile based on the received current vehicle data, the immobilization profile being characterized by a decrease in vehicle speed over a set time interval, the decrease being determined by at least an initial vehicle speed and the roadway congestion index;
   sending the immobilization profile to the vehicle over a wireless communication network; and
   adjusting at least one of a vehicle throttle and a vehicle brake to immobilize the vehicle in accordance with at least a part of the immobilization profile.

2. The method of claim 1, wherein generating the immobilization profile comprises configuring the immobilization profile to exhibit less than about a 20 percent decrease in the vehicle speed over approximately 5 seconds when initial vehicle speed is higher than a first predetermined speed.

3. The method of claim 1, wherein generating the immobilization profile comprises configuring the immobilization profile to exhibit less than about a 20 percent decrease in the vehicle speed over approximately 5 seconds when the roadway congestion index is greater than a first predetermined roadway index.

4. The method of claim 1, wherein generating the immobilization profile comprises generating a Gaussian profile.

5. The method of claim 4, wherein:
   generating the Gaussian profile comprises generating the Gaussian profile according to equation $y(x)=S_0 * e^{(-(a*x)^s)}$;
   $t_0$ is time when immobilization process is invoked;
   $S_0$ is the speed at $t_0$;
   a is fundamental adjustment factor; and
   s is secondary adjustment factor.

6. The method of claim 1, wherein generating the immobilization profile comprises generating a linear profile having one or more linear segments.

7. The method of claim 1, further comprising transmitting at least one vehicle powertrain control parameter based on the immobilization profile.

8. The method of claim 1, further comprising transmitting at least one vehicle braking control parameter based on the immobilization profile.

9. The method of claim 1, further comprising:
   generating a warning message; and
   providing the warning message to a vehicle operator prior to adjusting the vehicle throttle.

10. A method for immobilizing a vehicle in response to an immobilization signal from a remote location, comprising:
    determining current vehicle data regarding at least vehicle dynamics and driving conditions, the vehicle dynamics comprising vehicle speed on a roadway, the driving conditions comprising a roadway congestion index;
    obtaining an immobilization profile based on the current vehicle data, the immobilization profile being characterized by a decrease in vehicle speed over a set time interval, the decrease being determined by at least an initial vehicle speed and the roadway congestion index; and adjusting vehicle powertrain so that the vehicle speed approximates the immobilization profile.

11. The method of claim 10, wherein obtaining the immobilization profile comprises generating the immobilization profile based on the current vehicle data.

12. The method of claim 11, wherein obtaining the immobilization profile comprises generating the immobilization profile to exhibit less than about a 20 percent decrease in the vehicle speed over approximately 5 seconds when initial vehicle speed is higher than a first predetermined speed.

13. The method of claim 11, wherein obtaining the immobilization profile comprises generating the immobilization profile to exhibit less than about a 20 percent decrease in the vehicle speed over approximately 5 seconds when the roadway congestion index is greater than a first predetermined roadway index.

14. The method of claim 10, further comprising adjusting vehicle braking so that the vehicle speed approximates the immobilization profile.

15. The method of claim 10, wherein adjusting the vehicle powertrain comprises adjusting vehicle throttle.

16. The method of claim 10, further comprising:
generating a warning message; and
providing the warning message to a vehicle operator prior to adjusting the vehicle throttle.

17. A system for remotely immobilizing a vehicle, comprising:
a receiver unit for receiving current vehicle data regarding at least vehicle dynamics and driving conditions, the vehicle dynamics comprising vehicle speed on a roadway, the driving conditions comprising a roadway congestion index;
a processor unit for generating an immobilization profile based on the received current vehicle data, the immobilization profile being characterized by a decrease in vehicle speed over a set time interval, the decrease being determined by at least an initial vehicle speed and the a roadway congestion index; and
a transmitter unit for sending the immobilization profile to the vehicle over a wireless communication network.

18. The system as recited in claim 17, wherein the processor unit is programmed to generate the immobilization profile so that there is less than about a 20 percent decrease in the vehicle speed over approximately 5 seconds when initial vehicle speed is higher than a first predetermined speed.

19. The system as recited in claim 17, wherein the processor unit is programmed to generate the immobilization profile so that there is less than about a 20 percent decrease in the vehicle speed over approximately 5 seconds when the roadway congestion index is greater than a first predetermined roadway index.

20. The system as recited in claim 17, wherein:
the processor unit is further programmed to generate at least one vehicle powertrain control parameter based on the immobilization profile; and
the transmitter unit sends the at least one vehicle powertrain control parameter to the vehicle over the wireless communication network.

21. The system as recited in claim 17, wherein:
the processor unit is further programmed to generate at least one vehicle braking control parameter based on the immobilization profile; and
the transmitter unit sends the at least one vehicle braking control parameter to the vehicle over the wireless communication network.

22. The system as recited in claim 17, wherein:
the processor unit generates a warning message; and
the transmitter unit sends the warning message to the vehicle for display to a vehicle operator prior to adjustment of the vehicle throttle.

23. The system as recited in claim 17, wherein the first predetermined speed is about 150 km/hour.

24. The system as recited in claim 17, wherein the first predetermined roadway index is about 1.30.

25. A system for immobilizing a vehicle in response to an immobilization signal from a remote location, comprising:
an onboard vehicle computer is programmed to:
receive current vehicle data regarding vehicle dynamics and driving conditions, the driving conditions comprising a roadway congestion index;
obtain an immobilization profile based on the received current vehicle data; and
determine at least one vehicle powertrain control parameter, said at least one vehicle powertrain control parameter being selected from a list of parameters consisting of braking, throttle control and transmission control; and
a vehicle powertrain subsystem that adjusts itself in accordance with the at least one vehicle powertrain control parameter from the onboard computer so that vehicle speed approximates the immobilization profile.

26. The system as recited in claim 25, wherein the immobilization profile is characterized by a decrease in the vehicle speed over a set time interval, the decrease being determined by at least one of an initial vehicle speed and the roadway congestion index.

27. The system as recited in claim 26, wherein the immobilization profile is characterized by less than about a 20 percent decrease in the vehicle speed over approximately 5 seconds when initial vehicle speed is higher than a first predetermined speed.

28. The system as recited in claim 26, wherein the immobilization profile is characterized by less than about a 20 percent decrease in the vehicle speed over approximately 5 seconds when the roadway congestion index is greater than a first predetermined roadway index.

29. The system as recited in claim 25, wherein the onboard computer is further programmed to determine at least one vehicle braking control parameter.

30. The system as recited in claim 29, further comprising a vehicle braking subsystem that adjusts itself upon receiving the at least one vehicle braking control parameter from the onboard computer so that vehicle speed approximates the immobilization profile.

31. The system as recited in claim 25, wherein:
the at least one vehicle powertrain control parameter comprises a vehicle throttle control parameter; and
the vehicle powertrain subsystem that adjusts itself by adjusting vehicle throttle level.

32. The system as recited in claim 25, wherein the onboard computer is programmed to:
generate a warning message; and
provide the warning message to a vehicle operator prior to adjustment of the vehicle throttle.

33. The system as recited in claim 25, wherein the first predetermined speed is about 150 km/hour.

34. The system as recited in claim 25, wherein the first predetermined roadway index is about 1.30.

* * * * *